United States Patent
Liu

(10) Patent No.: US 9,227,474 B2
(45) Date of Patent: Jan. 5, 2016

(54) METHOD AND SYSTEM FOR ESTIMATING A TRAILER POSITION OF A TRAILER ASSOCIATED WITH A VEHICLE

(75) Inventor: Qiang Liu, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 288 days.

(21) Appl. No.: 13/537,335

(22) Filed: Jun. 29, 2012

(65) Prior Publication Data

US 2014/0005918 A1   Jan. 2, 2014

(51) Int. Cl.
*G01C 23/00* (2006.01)
*B60D 1/24* (2006.01)
*B60D 1/30* (2006.01)
*B60D 1/62* (2006.01)

(52) U.S. Cl.
CPC ..... *B60D 1/245* (2013.01); *B60D 1/30* (2013.01); *B60D 1/62* (2013.01)

(58) Field of Classification Search
CPC ............ B60D 1/245; B60D 1/30; B60D 1/62; B60T 8/1708; B60T 2230/06
USPC ........... 701/1, 36, 70; 340/341, 465; 180/445; 280/46, 482
See application file for complete search history.

(56) References Cited

U.S. PATENT DOCUMENTS

| | | | |
|---|---|---|---|
| 6,434,462 B1 | 8/2002 | Bevly et al. | |
| 7,509,199 B2 | 3/2009 | Rekow | |
| 7,715,953 B2 | 5/2010 | Shepard | |
| 7,904,226 B2 | 3/2011 | Dix | |
| 8,112,201 B2 | 2/2012 | Aral | |
| 8,116,977 B2 | 2/2012 | Aral et al. | |
| 2004/0130441 A1* | 7/2004 | Lee et al. | 340/431 |

OTHER PUBLICATIONS

Liu, Qiang, Characteristics of the Tractor-Implement Model and Corresponding Algorithms, Jun. 28, 2011, John Deere, pp. 1-16.*
Hodo, D.W.; Hung J.Y. Bevly, D.M.: Millhouse, S., Effects of Sensor Placement and Errors on Path Following control of a Mobile Robot-Trailer System, American Control Conference, pp. 2165-2170, 2007, New York City, NY.
Len Z. and Minor, M.A.: A Simple Tractor-Trailer Backing Control Law for Path Following with Side-Slope Compensation, IEEE International Conference on Robotics and Automation, pp. 2386-2391, 2011, Shanghai, China.
Khalil, H.K. Nonlinear System, New York., Macmillan Publising Co., 1992. p. 97-99.

(Continued)

*Primary Examiner* — Redhwan k Mawari
*Assistant Examiner* — Rodney P King

(57) ABSTRACT

A data processor determines a position solution or selects a position solution from a first position solution and a second position solution based on a comparison between the turning radius at a hitch point, $R_p$, and the tongue length, where $R_p = V_p/(\alpha'-\delta')$, where $V_p$ is a velocity at the hitch point, $\alpha'$ is the vehicle yaw rate, and $\delta'$ is the change in a vehicle slip angle. A trailer position of a trailer is estimated in accordance with a position solution (e.g., determined or selected position solution) based on the determined vehicle heading, the hitch length, and the tongue length.

24 Claims, 7 Drawing Sheets

(56) References Cited

OTHER PUBLICATIONS

Karkee, M., Steward, B.L.; Study of the open and closed loop characteristics of a tractor and a single axle towed implement system. Journal of Terramechanics 47, pp. 379-393, Jun. 9, 2010, United States.

Fossum, T.V.; Lewis, G.N. A Mathematical Model for Trailer-Truck Jackknifing. 1981. SIAM Review. vol. 23. No. 1., Jan. 1981, pp. 95-99.

Ray Liu. Implement Position Modeling for TST AirCart. Jul. 19, 2011.

Ray Liu. Characteristics of the Tractor-Implement Model and Corresponding Algorithms. Oct. 18, 2009.

* cited by examiner

METHOD AND SYSTEM FOR ESTIMATING A TRAILER POSITION OF A TRAILER ASSOCIATED WITH A VEHICLE

FIELD OF THE INVENTION

This invention relates to a method and system for estimating a trailer position of a trailer associated with a vehicle.

BACKGROUND

Certain prior art systems may attempt to model a trailer position of a towed trailer. Some prior art systems may inadequately attempt to estimate the trailer position or trailer path because a prior art equation for the trailer position is inaccurate or cannot be readily processed in real time with limited data processing resources available on a vehicle. Thus, there is a need for a method and system for estimating a trailer position of a trailer associated with vehicle on an accurate basis, a timely basis, or both.

SUMMARY OF THE INVENTION

In accordance with one embodiment, a system and method is capable of estimating a trailer position of a trailer propelled by a vehicle. A location-determining receiver determines a vehicle heading of a vehicle with reference to a reference heading. A hitch length and a tongue length are entered or detected. The hitch length extends from a rear axis of the vehicle to a hitch point (e.g., hitch pivot point) and the tongue length extends from a trailer axis to the hitch point. A data processor determines a position solution or selects a position solution from a first position solution and a second position solution based on a comparison between a turning radius at the hitch point ($R_p$) and the tongue length, where $Rp=Vp/(\alpha'-\delta')$, where $V_p$ is the velocity at the hitch point, $\alpha'$ is the vehicle yaw rate, and $\delta'$ is the change in a vehicle slip angle. A trailer position of a trailer is estimated in accordance with a position solution (e.g., determined or selected position solution) based on the determined vehicle heading, the hitch length and the tongue length.

DESCRIPTION OF THE PREFERRED EMBODIMENT

Figure 1:
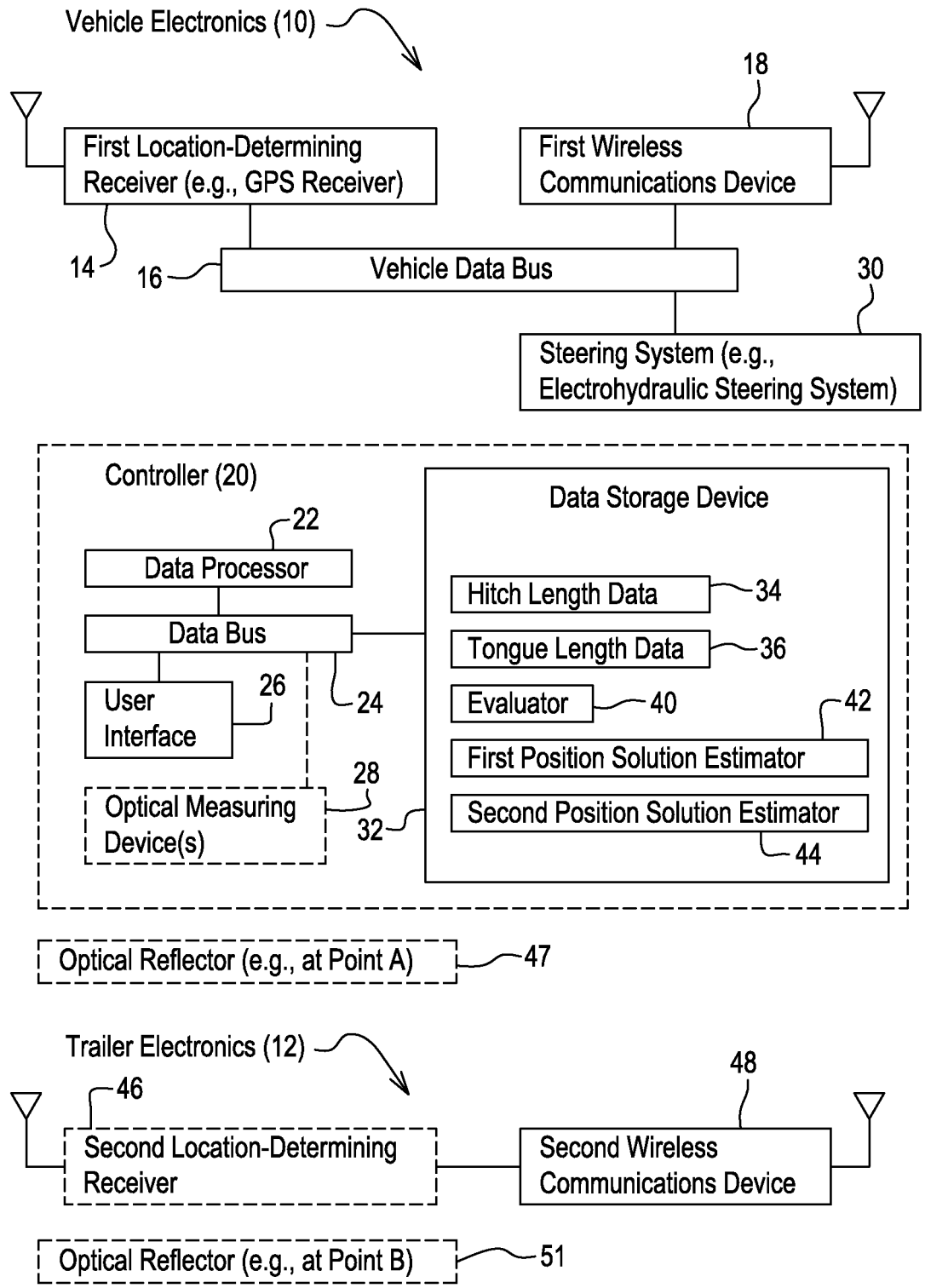
FIG. 1 is a block diagram of one embodiment of a system for estimating a trailer position of a trailer associated with a vehicle.
Figure 3:
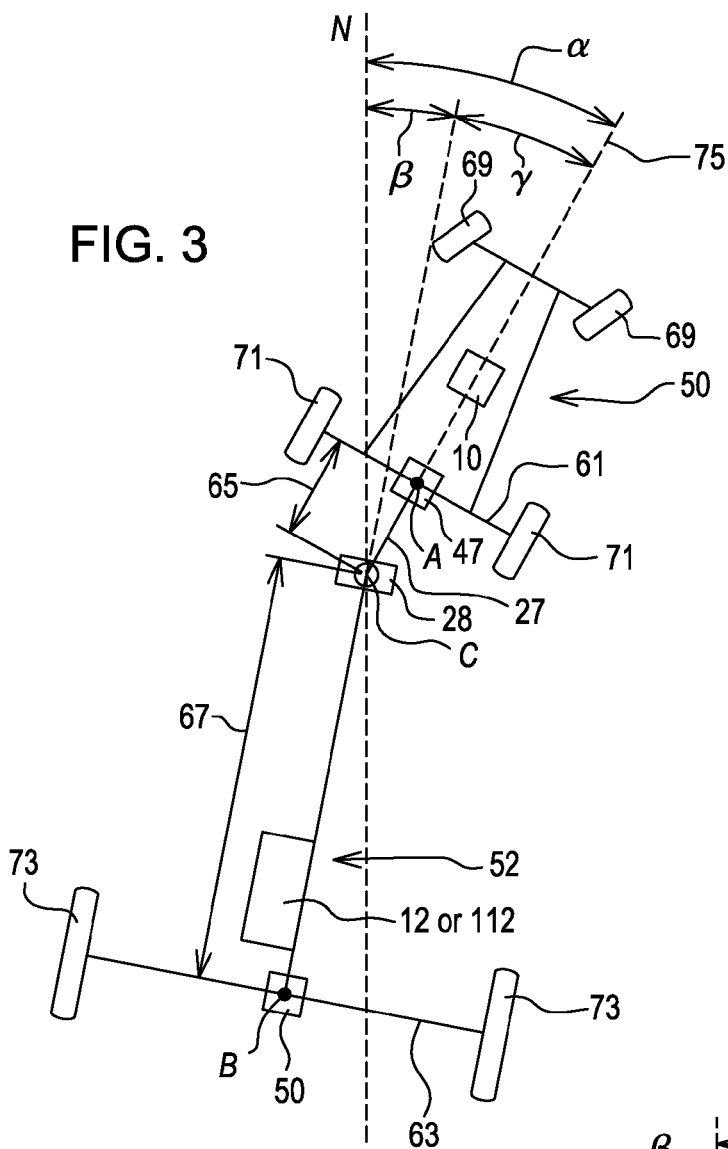
FIG. 3 is a first illustrative diagram that shows or defines various parameters that appear in equations for estimating a trailer position of the towed trailer.

In accordance with one embodiment, FIG. 1 shows a system 11 that is capable of estimating a trailer position of a trailer (e.g., 52 in FIG. 3) that is coupled to or propelled (e.g., pulled or pushed) by a vehicle (e.g., 50 in FIG. 3). In one embodiment, the vehicle comprises a tractor and the trailer comprises an implement.

In FIG. 1, vehicle electronics 10 or a vehicle system 11 comprises a first location-determining receiver 14, a first wireless communications device 18, a steering system 30, and a controller 20 that can communicate via a vehicle data bus 16 or by one or more transmission lines. In one embodiment, the controller 20 comprises a data processor 22, a data storage device 32, and a user interface 26 that are coupled to a data bus 24.

In one embodiment, which is illustrated in FIG. 1, the trailer electronics 12 or trailer system comprises an optional second location-determining receiver 46 coupled to a second wireless communications device 48. The optional second location-determining receiver 46 may provide an output signal or output data that is indicative of a trailer heading of the trailer, or a hitch angle. In one embodiment, the hitch angle may be defined as an angle between the hitch of the vehicle 50 and a reference heading (e.g., magnetic North pole). The trailer heading (e.g., β) defines the angle of the longitudinal axis or heading of the trailer with respect to a reference heading (e.g., magnetic North pole).

The first location-determining receiver 14 may comprise a Global Positioning System (GPS) receiver, or another satellite navigation receiver that can estimate the position, velocity and heading of an antenna of the first location-determining receiver 14 that is mounted on the vehicle 50. The first location-determining receiver 14 may comprise an augmentation receiver that supports the reception of a differential correction signal from one or more satellites or terrestrial base stations to estimate a precise position of the antenna based on carrier phase measurements.

The optional second location-determining receiver 46 may comprise a Global Positioning System (GPS) receiver, or another satellite navigation receiver that can estimate the position, velocity and heading of an antenna of the optional second location-determining receiver 46 that is mounted on the trailer 52. The optional second location-determining receiver 46 may comprise an augmentation receiver that supports the reception of a differential correction signal from one or more satellites or terrestrial base stations to estimate a precise position of the antenna based on carrier phase measurements.

The optional second location-determining receiver 46 is optional and may be omitted, as indicated by the dashed lines in FIG. 1. The system 11 of FIG. 1 is capable of determining or selecting a position solution for the trailer with or without the second location-determining receiver 46. In one configuration, the second location-determining receiver 46 has an antenna on the trailer for determining a trailer heading or trailer position, where the data processor 22 continuously or repeatedly (e.g., once for each time interval) determines a position solution (e.g., from the first position solution equations, the second position solution equations, or both serially) for the trailer position, but only applies the position solution (e.g., from the first position solution equations, the second position solution equations, or both serially) when the second location-determining receiver 46 fails to reliably receive a minimum required number of satellite signals or a differential correction signal during a down time period (e.g., which may equal one or more time intervals). For example, when the second location-determining receiver 46 reliably receives the minimum number of required satellite signals and the differential correction signal, the trailer heading or trailer position estimate from the second location-determining receiver 46 is used in lieu of the determined position solution (e.g., from the first position solution or the second position solution equations). The first position solution or the second position solution equations are kinematic model based solutions that depend upon vehicle-trailer parameters, as opposed the estimated measurement solution of the trailer heading or trailer position afforded by the second location-determining receiver 46. Accordingly, the method and system of the disclosure may complement the operation of the second location-determining receiver 46 to provide a trailer position estimate even when the second location-determining receiver 46 receives signals of low quality, poor signal strength, multipath signals, jammed signals, loss of lock on the carrier phase position solution, or otherwise.

The first wireless communications device 18 comprises a transceiver, a transmitter or a receiver for communicating with the second wireless communications device 48 via an electromagnetic signal (e.g., radio frequency or microwave signal). The second wireless communications device 48 comprises a transceiver, a transmitter or a receiver for communicating with the first wireless communications device 18 via an electromagnetic signal (e.g., radio frequency or microwave signal). The first wireless communications device 18 is carried by or secured to the vehicle 50, whereas the second wireless communications device 48 is carried by or secured to the trailer 52.

In an alternate embodiment, the first wireless communications device 18 and the second wireless communications device 48 may be replaced by wireline transceivers that communicate over a transmission line that runs between the vehicle 50 and the trailer 52.

The data processor 22 may comprise a microprocessor, a microcontroller, a programmable logic device, a programmable logic array, an application specific integrated circuit, a digital signal processor, a logic circuit, an arithmetic logic unit, or another electronic device for processing or manipulating data.

The data storage device 32 may comprise electronic memory, random access memory, electronically erasable programmable memory, non-volatile memory, a magnetic storage device, an optical storage device, a hard disc drive, an optical drive, or another data storage device for storing, retrieving, or archiving data. The data storage device 32 may store executable software instructions or other software (e.g., one or more software modules) for executing on the data processor 22, for example.

The data storage device 32 stores, retrieves, or manages one or more of the following: hitch length data 34, tongue length data 36, an evaluator 40, a first position solution estimator 42, and a second position solution estimator 44.

The evaluator 40 comprises evaluation instructions, an electronic module, or a software module for determining or selecting a position solution (e.g., $\theta$). The first position solution estimator 42 comprises an estimator for estimating a first position solution based on a first set of one or more equations. For example, the first set of equations may comprise those equations later discussed in conjunction with step S110 of FIG. 7. The second position solution estimator 44 comprises an estimator for estimating a second position solution based on a second set of one or more equations. For example, the first set of equations may comprise those equations later discussed in conjunction with step S112 of FIG. 8. In one configuration, the first position solution estimator 42 may comprise software instructions, a software module, or an electronic module (e.g., a programmable logic semiconductor device). Similarly, the second position solution estimator 44 may comprise software instructions, a software module, or an electronic module (e.g., a programmable logic semiconductor device).

The user interface 26 may comprise one or more of the following: a keypad, a key board, a pointing device (e.g., an electronic mouse), a switch, a console, a display, a touch-screen display, or the like. The user interface 26 supports the user's entry, input, and output or display of data. The user interface 26 supports the user's entry of the hitch length data 34, the tongue length data 36.

Optional elements in FIG. 1 are illustrated with dashed lines. An optional optical measuring device 28 may be coupled to the data bus 24. An optional first optical reflector 47 may be placed on the vehicle 50 at point A, which is illustrated in FIG. 3. An optional second optical reflector 51 may be placed on the trailer 52 at point B, which is illustrated in FIG. 3. The first optical reflector 47 supports the estimation of a first distance (e.g., $\overline{AC}$) between the first optical reflector 47 and the optical measuring device 28. Similarly, the second optical reflector 51 supports the estimation of a second distance (e.g., $\overline{AB}$) between the second optical reflector 51 the optical measuring device 28.

If the optional optical measuring device 28 is used, the optical measuring device 28 may estimate the hitch length, the tongue length, or both and provide corresponding estimated hitch length data 34 and tongue length data 36 to the data processor 22 or to the data storage device 32. Accordingly, the optical measuring device 28 may render it unnecessary for a user to measure manually and enter manually, via the user interface 26, the hitch length and the tongue length for a particular configuration of the vehicle and trailer.

In certain embodiments, the hitch length data 34 and tongue length data 36 is stored in non-volatile electronic memory of the data storage device 32 such that the hitch length data 34 and the tongue length data 36 does not need to be re-established or re-entered each time the vehicle is started or turned on. For example, the hitch length data 34 and the tongue length data 36 may be associated with a corresponding trailer identifier, where the trailer identifier may be stored in a radio frequency identification tag (e.g., RFID) or in a code transmitted by the second wireless communications device 48.

In one embodiment, the steering system 30 may comprise one or more of the following: an Ackerman steering system, an electro-hydraulic steering system, an electrically driven steering system, a rack and pinion gear steering system assisted by an electro-hydraulic controller or an electric motor, or another steering system 30.

Figure 2:
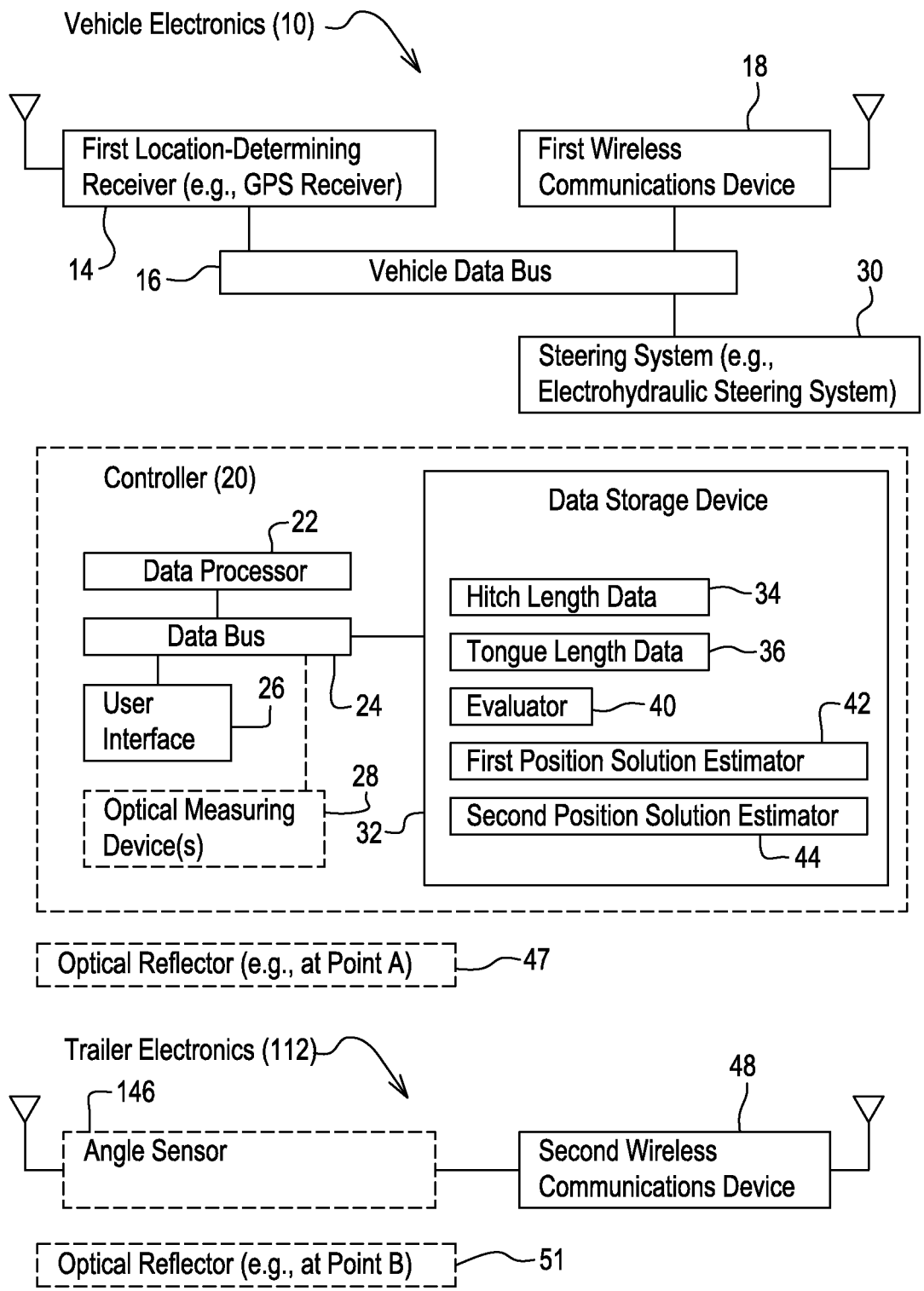
FIG. 2 is a block diagram of another embodiment of a system for estimating a trailer position of a trailer associated with a vehicle.

The system 111 of FIG. 2 is similar to the system 11 of FIG. 1, except the system 111 of FIG. 2 replaces the optional second location-determining receiver 46 with an angular sensor or an optional angle sensor 146. Like reference numbers in FIG. 1 and FIG. 2 indicate like elements.

The optional second location-determining receiver 46 may be more expensive than an optional angle sensor 146 because the optional second location-determining receiver 146 may require: (1) a subscription to a differential correction signal from a satellite network service provider or a terrestrial network service provider, or (2) complex electronic circuitry and software to calculate precise position of the optional second location-determining receiver 46 from carrier phase measurements.

The optional angle sensor 146 is shown in dashed lines in FIG. 2 because it can be omitted. The angle sensor 146 associated with the trailer can determine a trailer heading or trailer position, where the position solution (e.g., from the first position solution equation, second position solution equation, or both) is repeatedly or continuously determined (e.g., for each time interval), but only applied when the angle sensor 146 fails to determine or communicate a reliable hitch angle to the data processor 22 for determination of the trailer heading or the trailer position during a down time period. However, if the optional angle sensor 146 is functioning properly, the method and system may use the data or signal outputted by the optional angle sensor 146 to estimate a trailer position or trailer heading of the trailer.

The trailer electronics 112 in FIG. 2 comprises the optional angle sensor 146 to estimate the one or more of the following: (1) a hitch angle (e.g., $\gamma$) at the hitch pivot point (e.g., Point C) between the vehicle 50 and the trailer 52, or (2) an trailer heading of the trailer 52 with respect to a reference heading (e.g., magnetic North pole or N), which may be derived from the hitch angle. In certain configurations, the hitch pivot point may be referred to as the hitch pin. In any event, the hitch pivot point has a rotational axis associated with the Point C, as illustrated in FIG. 3. In one embodiment, the optional angle sensor 146 may comprise a variable resistor with a shaft that rotates the shaft position in response to a change in the hitch angle (e.g., $\gamma$), at the pivot point (e.g., Point C), between the heading of the trailer 52 and the heading of the vehicle 50. In another embodiment, the optional angle sensor 146 may comprise the combination of a magnet attached to vehicle 50 or hitch 27 and a magnetic field sensor or magneto-resistive sensor, where a change in the magnitude or direction of the magnetic field indicates a change in the hitch angle (e.g., $\gamma$) at the pivot point (e.g., Point C). In another embodiment, the optional angle sensor comprises one or more accelerometers aligned with various axes to indicate the hitch angle. In one embodiment, the optional angle sensor 146 estimates a hitch angle at hitch pivot point associated with confluence of the tongue of the hitch 27 or the hitch 27.

FIG. 3 illustrates a plan view of the system (11 or 111) of FIG. 1 or FIG. 2, associated with a vehicle 50 that pulls a trailing vehicle 52 or trailer. Like reference numbers in any of FIG. 1, FIG. 2 and FIG. 3 indicate like elements.

The geometric relationships and spatial relationships are illustrated for the vehicle 50 and the trailer 52. Further, the relative angular positions of the vehicle 50 and trailer 52 are illustrated. The vehicle electronics 10 are mounted on or carried by the vehicle 50, whereas the trailer electronics (12 or 112) are mounted on or carried by the trailer 52.

At Point C, the optional optical measuring device 28 or devices may be located. A first optical reflector 47 is located at Point A of the vehicle 50, whereas a second optical reflector 51 is located at Point B of the trailer 52. The optical measuring device 28 may automatically provide one or more of the following: (a) a measurement of distance $\overline{AC}$ or hitch length 65 of hitch 27, and (b) a measurement of distance $\overline{BC}$ or tongue length 67.

In FIG. 3, the angles are defined as follows: (1) $\alpha$ is the vehicle heading (e.g., tractor heading); (2) $\beta$ is the trailer heading (e.g., implement heading), and (3) $\gamma$ is the hitch angle, which is equal to $\alpha-\beta$. The angles are measured with reference to a reference heading (e.g., such as the magnetic North pole, which is designated as "N" in FIG. 3). The vehicle heading of the vehicle 50 is defined as the angle between the reference heading (N) and a centerline 75 or longitudinal line associated of the vehicle 50.

In FIG. 3, the vehicle 50 has front wheels 69 and rear wheels 71. The vehicle 50 has a lead rear axle 61. The rear axle 61 may comprise a solid axle, differential, a transaxle, a differential with constant velocity joints, or the like. The trailer has rear wheels 73 associated with a trailer rear axle 63. The rear axle 63 may comprise a solid axle, differential, a transaxle, a differential with constant velocity joints, or the like. Point A is located at or near the center of vehicle's (e.g., tractor's) rear axle 61 or a point on the rear axle with zero lateral velocity; Point B is located at or near the center of the trailer's axle 63 (e.g., implement's axle), or a point on the trailer's axle 63 with zero lateral velocity. $\overline{AC}$ equals the hitch length 65 and $\overline{BC}$ equals the tongue length 67. Point C is the rotational axis or hitch pivot point.

The target vehicle path refers to a target path for the vehicle 50, whereas the target trailer path refers to a target path for the trailer 52. The target vehicle path may comprise one or more of the following: a generally linear path, a curved path, a contour, a series of generally parallel rows of a generally linear path, a series of generally parallel rows of curved paths or contours, turns or row-end turns for connecting adjacent or different rows of the target trailer path, or a group of paths that cover a work area or field. The target trailer path may comprise one or more of the following: a generally linear path, a curved path, a contour, a series of generally parallel rows of a generally linear path, a series of generally parallel rows of curved paths or contours, turns or row-end turns for connecting adjacent or different rows of the target trailer path, or a group of paths that cover a work area or field.

In one embodiment, the target vehicle path and the target trailer path are related, and the relationship can depend upon which wheels of the vehicle or the trailer are steerable. If only the front wheels of the vehicle 50 are steerable, the combination of the vehicle 50 and the trailer 52 may be modeled in accordance with a bicycle model of movement, or modified bicycle model of movement, or another model such that the steering of the vehicle 50 (e.g., in conformance with a target vehicle path) can lead the trailer 52 to track the target trailer path.

An observed vehicle path may be determined by a first location-determining receiver 14 that collects a series of estimated vehicle positions versus time. Similarly, an observed trailer path may be determined by an optional second location-determining receiver 46 (FIG. 1) or by an optional angle sensor 146 (FIG. 2) and a controller 20 that collects a series of estimated trailer positions versus time. The observed vehicle path may differ from the target vehicle path by a vehicle error and the observed trailer path may differ from the target trailer path by a trailer error. A controller 20 may steer the vehicle via the steering system 30 to minimize the vehicle error, the trailer error, or both while tracking a target vehicle path, a target trailer path, or both.

Figure 4:
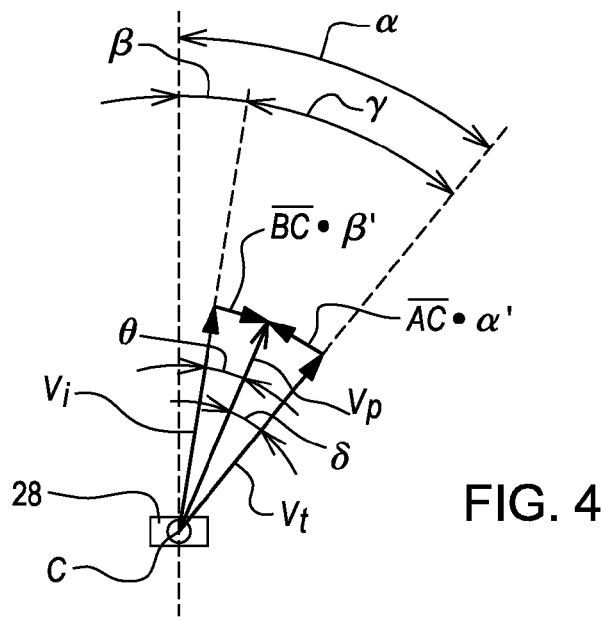
FIG. 4 is a second illustrative diagram that shows or defines various parameters that appear in equations for estimating a position of the towed trailer.

FIG. 4 illustrates a relationship between various vectors and angles that characterize the movement and physical relationship between the vehicle and the trailer. Like reference numbers in FIG. 3 and FIG. 4 indicate like elements. In FIG. 4, $V_t$ represents the tractor speed at control point and $V_i$ is the implement speed at the control point. In FIG. 4, $\alpha'$ is tractor yaw rate; $\beta'$ is the implement yaw rate, where the hitch angle ($\gamma$) is $\gamma=\alpha-\beta$.

Figure 5:
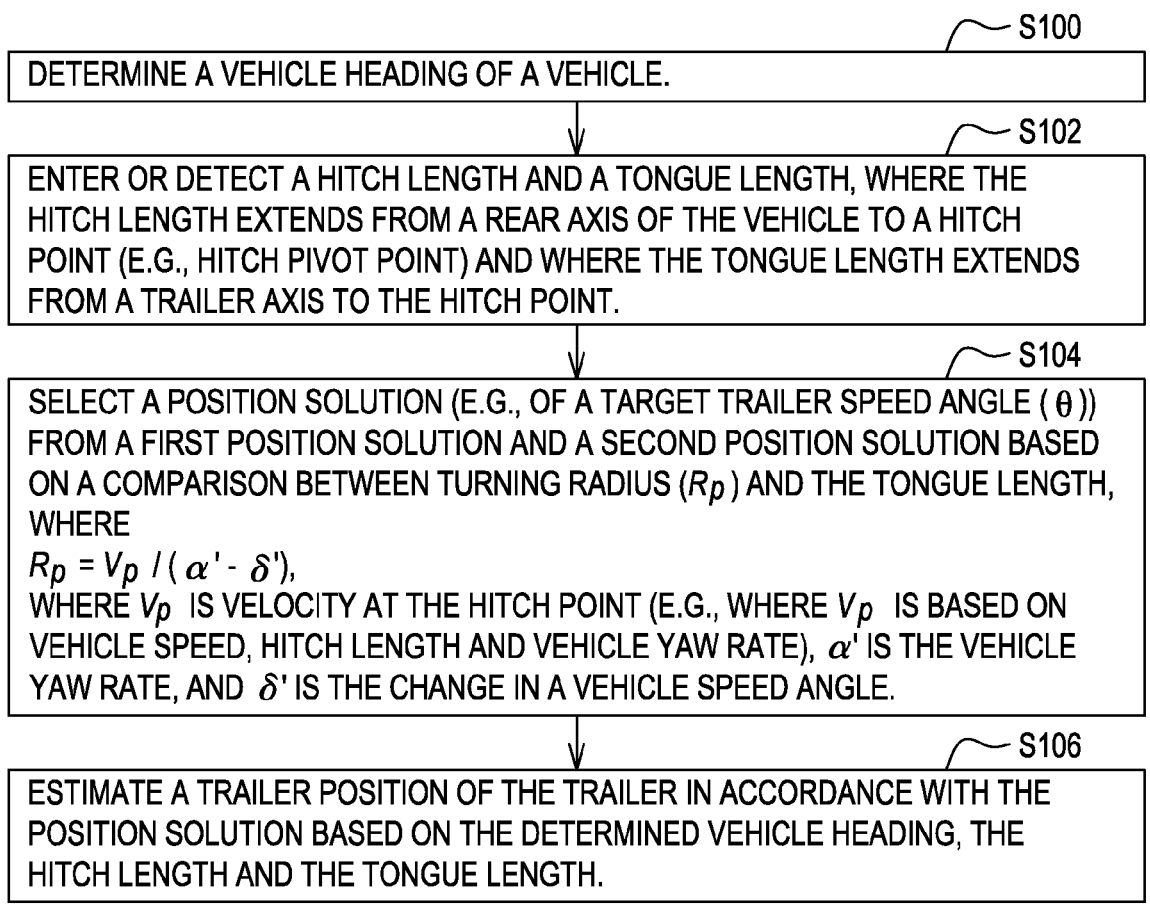
FIG. 5 is a flow chart of one embodiment of a method for estimating a trailer position of a trailer associated with a vehicle.

The method of FIG. 5 may be applied to any of the embodiments of the systems (11 or 111) disclosed in this document, for example. The method of FIG. 5 begins in step S100.

In step S100, a vehicle heading of a vehicle (e.g., 50) is determined. For example, a first location-determining receiver 14 determines a vehicle heading of a vehicle 50 with reference to a reference heading (e.g., magnetic North pole or N).

Step S100 may be executed in accordance with one or more techniques that may be applied alternately or cumulatively. Under a first technique, a first location-determining receiver 14 determines a vehicle heading of a vehicle 50 with reference to a reference heading (e.g., magnetic North pole or N).

Under a second technique, a first location-determining receiver 14 determines a vehicle heading of a vehicle 50 with reference to a reference heading (e.g., magnetic North pole or N) and an optional second location-determining receiver 46 determines (e.g., to the best of its ability) a trailer heading of a trailer with reference a reference heading (e.g., magnetic North pole or N).

Under a third technique, a first location-determining receiver 14 determines a vehicle heading of a vehicle 50 with reference to a reference heading (e.g., magnetic North pole or N) and an optional angle sensor 146 determines (or facilitates derivation of) a trailer heading of a trailer 52 with reference to reference heading (e.g., magnetic North pole or N). In one embodiment, if the optional angle sensor 146 is used, the data processor 22 may derive or calculate the trailer heading from a hitch angle and vehicle heading. For example, the data processor 22 may determine the trailer heading from data input from the optional angle sensor 146 based on the following equation: $\beta = \alpha - \gamma$, where $\beta$ is the trailer heading, $\alpha$ is the vehicle heading, and $\gamma$ is the hitch angle.

In step S102, a user interface 26 supports a user's entry of a hitch length and a tongue length, or a sensor detects a hitch length and a tongue length, where the hitch length extends from a rear axis of the vehicle to a hitch point (e.g., hitch pivot point) and where the tongue length extends from a trailer axis to the hitch point (e.g., hitch pivot point). The hitch length and tongue length may be stored in a data storage device 32 (e.g., non-volatile memory) for later retrieval by a data processor 22, for example.

In step S104, a data processor 22 selects a position solution (e.g., of a target trailer slip angle $\theta$) from a first position solution and a second position solution based on a comparison between the turning radius at the hitch point (or hitch pivot point) ($R_p$) and the tongue length, where $R_p = V_p/(\alpha'-\delta')$, where $V_p$ is the velocity at the hitch point (e.g., hitch pivot point) based on vehicle speed, hitch length, and vehicle yaw rate, $\alpha'$ is the vehicle yaw rate, and $\delta'$ is the change in a vehicle slip angle. In one illustrative example, if the target vehicle path is generally linear and if the vehicle is moving at a constant forward velocity (e.g., to apply an agricultural input) along the target vehicle path, the velocity at the hitch point may be constant for a certain duration, for example.

Step S104 may be carried out by various techniques that may be applied separately or cumulatively. Under a first technique, the data processor 22 is adapted to select the first position solution if the turning radius at the hitch point (e.g., hitch pivot point) ($R_p$) is greater than or equal to the tongue length. Under a second technique, the data processor 22 is adapted to select the second position solution is selected if the turning radius at the hitch point (e.g., hitch pivot point) ($R_p$) is less than the tongue length. Under a third technique, the data processor 22 is adapted to select the first position solution if the turning radius at the hitch point (e.g., hitch pivot point) ($R_p$) is greater than or equal to the tongue length, where the first position solution is associated with steady state movement of the trailer 52 with respect to the target path (e.g, target trailer path). Under a fourth technique, the data processor 22 is adapted to select the second position solution is selected if the turning radius at the hitch point (or hitch pivot point) $R_p$ is less than the tongue length, where the second position solution is associated with dynamic movement of the trailer 52 with respect to the target path (e.g., target trailer path).

Under a fifth technique for carrying out S104, the velocity at the hitch point or hitch pivot point, $V_p$, may be established by solving or executing the equation where $V_p = \sqrt{V_t^2 + (\overline{AC} \cdot \alpha')^2}$, where $V_t$ is the vehicle speed at control point, $\alpha'$ is the vehicle yaw rate, and $\overline{AC}$ is the hitch length.

Under a sixth technique, the first position solution for the trailer slip angle $\theta$ is determined by the data processor 22 in accordance with the following equations (i.e., first position solution equation(s)):

$$\theta = \theta_\infty + 2\tan(y), \text{ where } \theta_\infty = \arcsin\left(\frac{\overline{BC}}{R_p}\right), y = \frac{-y_1 \cos\theta_\infty}{1 - y_1 \sin\theta_\infty},$$

$$y_1 = \frac{y_0}{y_0 \sin\theta_\infty - \cos\theta_\infty} e^{-(\cos\theta_\infty/\lambda)t},$$

$\theta = \alpha - \beta - \delta$, $\alpha$ is the vehicle heading, $\beta$ is the trailer heading, $\delta$ is the vehicle slip angle, and $\overline{BC}$ is the tongue length, $\lambda = \overline{BC}/V_p$, t is time, and wherein $V_p$ is the velocity at the hitch point (e.g., hitch pivot point) based on $$V_p = \sqrt{V_t^2 + (\overline{AC} \cdot \alpha')^2},$$

$V_t$ is the vehicle speed at control point, $\alpha'$ is the vehicle yaw rate, $\overline{AC}$ is the hitch length.

Under a seventh technique, the second position solution for the trailer slip angle $\theta$ is determined by the data processor 22 in accordance with integration of the following expression (i.e., second position solution equation(s)):

$$-\frac{2}{\sqrt{(\overline{BC}/R_p)^2 - 1}} \arctan\left[\frac{1 - \tan\left(\frac{\theta}{2}\right)}{\sqrt{(\overline{BC}/R_p)^2 - 1}}\right]\Bigg|_{\theta_0}^{\theta} = t,$$

where $\overline{BC}$ is the tongue length, $R_p = V_p/(\alpha'-\delta')$, $\alpha'$ is the vehicle yaw rate, $\delta'$ is the change in a vehicle slip angle; $V_p$ is the velocity at the hitch point (e.g., hitch pivot point) based on $$V_p = \sqrt{V_t^2 + (\overline{AC} \cdot \alpha')^2},$$

$V_t$ is the vehicle speed at control point, $\overline{AC}$ is the hitch length, and $\alpha'$ is the vehicle yaw rate, t is time, $\theta_0$ is the initial trailer slip angle, and $\alpha$ is the vehicle heading, $\beta$ is the trailer heading, $\delta$ is the vehicle slip angle.

In step S106, the data processor 22 estimates a trailer position of the trailer in accordance with the position solution (e.g., the selected position solution) based on the determined vehicle heading, the hitch length and the tongue length. For example, the data processor 22 estimates a resultant position solution that is modeled by a first position solution, the first position solution equations, a second position solution, the second position solution equations, or by a time-varying combination of the first position solution and the second position solution. The above time-varying combination can be achieved through iterative application of the method of FIG. 5 over multiple evaluation time intervals such that the optimum resultant position solution, among the first position solution and the second position solution, is selected for any given evaluation time interval. For instance, the above time-varying combination may alternate during different time intervals between the first position solution and the second position solution to accurately track the target trailer position or target trailer path in real time, or when the second location determining receiver does not receive a reliable satellite signal, a reliable differential correction signal or function properly. Further, if an optional second location determining receiver 46 is used, the time-varying combination of the first position solution and the second position solution can be used as an back-up determination (e.g., an accurate and timely back-up solution) of trailer heading or trailer position during temporary outages or inadequate reception of one or more satellite signals or one or more correction signals.

Step S106 supports the determination of an accurate position of the trailer that can be used to activate a sprayer or distribution system for spraying or distributing crop inputs on a field in accordance with a zoned-distribution plan, for example. Crop inputs may comprise seeds, chemicals, pesticides, insecticides, fungicides, fertilizer, acidifiers, lime, nitrogen, trace minerals, biocides or other treatments for crops, the ground, plants, or vegetation. The accurate and timely determination of the trailer position can be used to trigger the start or end of a distribution of a crop input, or the rate of a crop input on field to minimize overlap of adjacent passes of the trailer and to achieve a target rate of application of the crop input in a corresponding zone of the field. If the trailer comprises sprayer with a boom, the trailer position may be used to turn off or on certain boom segments to control the swath width of the sprayer, for example.

In an alternate embodiment, step S106 may support the determination of a target vehicle heading (or vehicle path) that produces a target trailer position or trailer path. The controller 32 may search iteratively for the target vehicle heading that satisfies the first position solution, the second position solution or both for each evaluation time interval. In turn, the controller 32 may instruct the steering system to steer the vehicle 50 in accordance with the target vehicle heading.

Figure 6:
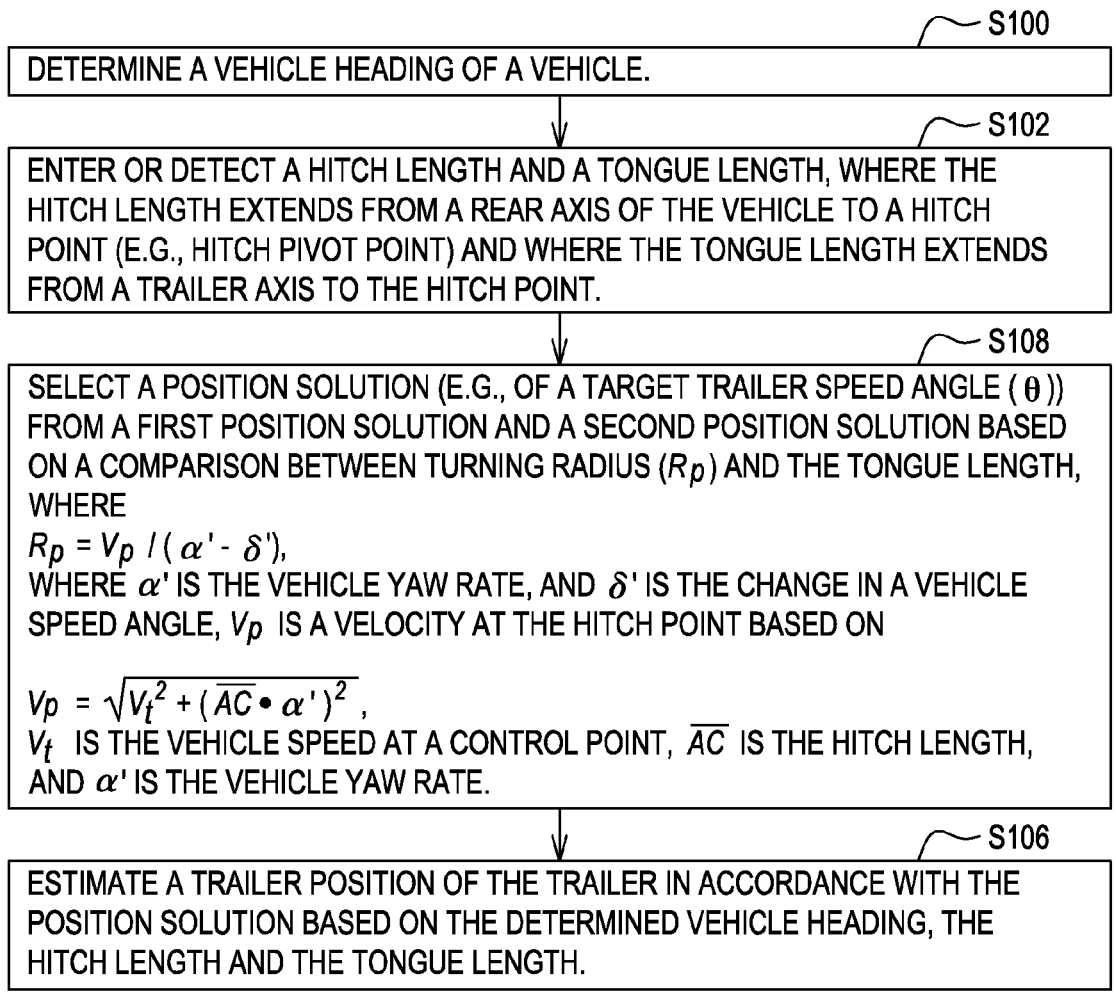
FIG. 6 is a flow chart of another embodiment of a method for estimating a trailer position of a trailer associated with a vehicle.

The method of FIG. 6 is similar to the method of FIG. 5, except the method of FIG. 6 replaces step S104 with step S108. Like steps in FIG. 5 and FIG. 6 indicate like steps or procedures. The method of FIG. 6 begins in step S100.

In step S100, a vehicle heading of a vehicle (e.g., 50) is determined. For example, a first location-determining receiver 14 determines a vehicle heading of a vehicle 50 with reference to a reference heading (e.g., magnetic North pole or N).

Step S100 may be executed in accordance with one or more techniques that may be applied alternately or cumulatively. Under a first technique, a first location-determining receiver 14 determines a vehicle heading of a vehicle 50 with reference to a reference heading (e.g., magnetic North pole or N).

Under a second technique, a first location-determining receiver 14 determines a vehicle heading of a vehicle 50 with reference to a reference heading (e.g., magnetic North pole or N) and an optional second location-determining receiver 46 determines (e.g., to the best of its ability) a trailer heading of a trailer with reference a reference heading (e.g., magnetic North pole or N).

Under a third technique, a first location-determining receiver 14 determines a vehicle heading of a vehicle 50 with reference to a reference heading (e.g., magnetic North pole or N) and an optional angle sensor 146 determines (or facilitates derivation of) a trailer heading of a trailer 52 with reference to reference heading (e.g., magnetic North pole or N). In one embodiment, if the optional angle sensor 146 is used, the data processor 22 may derive or calculate the trailer heading from a hitch angle and vehicle heading. For example, the data processor 22 may determine the trailer heading from data input from the optional angle sensor 146 based on the following equation: $\beta=\alpha-\gamma$, where $\beta$ is the trailer heading, $\alpha$ is the vehicle heading, and $\gamma$ is the hitch angle.

In step S102, a user interface 26 supports a user's entry of a hitch length and a tongue length, or an optical measuring device 28 (or other sensor) detects a hitch length and a tongue length, where the hitch length extends from a rear axis of the vehicle to a hitch point (e.g., hitch pivot point) and where the tongue length extends from a trailer axis to the hitch point (e.g., hitch pivot point). The hitch length and tongue length may be stored in a data storage device 32 (e.g., non-volatile memory) for later retrieval by a data processor 22, for example.

In step S108, a data processor 22 selects a position solution (e.g., of a target trailer slip angle $\theta$) from a first position solution and a second position solution based on a comparison between turning radius at the hitch point (e.g., hitch pivot point) ($R_p$) and the tongue length, where $Rp=Vp/(\alpha'-\delta')$, where $V_p$ is the velocity at the hitch point (e.g., hitch pivot point), $\alpha'$ is the vehicle yaw rate, and $\delta'$ is the change in a vehicle slip angle, $$V_p = \sqrt{V_t^2 + (\overline{AC}\cdot\alpha')^2},$$

$V_t$ is the vehicle speed at control point, $\overline{AC}$ is the hitch length, and $\alpha'$ is the vehicle yaw rate.

Step S108 may be carried out by various techniques that may be applied separately or cumulatively. Under a first technique, the data processor 22 is adapted to select the first position solution if the turning radius at a hitch pivot point $R_p$ is greater than or equal to the tongue length. Under a second technique, the data processor 22 is adapted to select the second position solution is selected if the turning radius at a hitch pivot point $R_p$ is less than the tongue length. Under a third technique, the data processor 22 is adapted to select the first position solution if the turning radius at a hitch pivot point $R_p$ is greater than or equal to the tongue length, where the first position solution is associated with steady state movement of the trailer 52 with respect to the target path. Under a fourth technique, the data processor 22 is adapted to select the second position solution is selected if the turning radius at a hitch pivot point $R_p$ is less than the tongue length, where the second position solution is associated with dynamic movement of the trailer 52 with respect to the target path.

Under a fifth technique, the first position solution for the trailer 52 slip angle $\theta$ is determined by the data processor 22 in accordance with the following equations: $\theta=\theta_\infty+2\tan(\gamma)$, where $$\theta_\infty = \arcsin\left(\frac{\overline{BC}}{R_p}\right), y = \frac{-y_1\cos\theta_\infty}{1-y_1\sin\theta_\infty},$$

$$y_1 = \frac{y_0}{y_0\sin\theta_\infty-\cos\theta_\infty}e^{-(\cos\theta_\infty/\lambda)t},$$

$\theta=\alpha-\beta-\delta$, $\alpha$ is the vehicle heading, $\beta$ is the trailer 52 heading, $\delta$ is the vehicle slip angle, and $\overline{BC}$ is the tongue length, $\lambda = \overline{BC}/V_p$, t is time, and wherein $V_p$ is the velocity at the hitch point (e.g., hitch pivot point) based on $$V_p = \sqrt{V_t^2 + (\overline{AC} \cdot \alpha')^2},$$

$V_t$ is the vehicle speed at control point, $\alpha'$ is the vehicle yaw rate, and $\overline{AC}$ is the hitch length.

Under a sixth technique, the second position solution for the trailer 52 slip angle $\theta$ is determined by the data processor 22 in accordance with integration of the following expression:

$$-\frac{2}{\sqrt{(\overline{BC}/R_p)^2 - 1}} \arctan\left[\frac{1 - \tan\left(\frac{\theta}{2}\right)}{\sqrt{(\overline{BC}/R_p)^2 - 1}}\right]_{\theta_0}^{\theta} = t,$$

where $\overline{BC}$ is the tongue length, $R_p = V_p/(\alpha'-\delta')$, $\alpha'$ is the vehicle yaw rate, $\delta'$ is the change in a vehicle slip angle; $V_p$ is the velocity at the hitch point (e.g., hitch pivot point) based on $$V_p = \sqrt{V_t^2 + (\overline{AC} \cdot \alpha')^2},$$

$V_t$ is the vehicle speed at control point, $\overline{AC}$ is the hitch length, and $\alpha'$ is the vehicle yaw rate, t is time, $\theta_0$ is the initial trailer 52 slip angle, $\alpha$ is the vehicle heading, $\beta$ is the trailer heading, and $\delta$ is the vehicle slip angle.

In step S106, the data processor 22 estimates a trailer position of the trailer in accordance with the position solution (e.g., the selected position solution) based on the determined vehicle heading, the hitch length and the tongue length. Additional aspects of S106 that were previously described in this document apply with equal force to the method of FIG. 6.

In an alternate embodiment, step S106 may support the determination of a target vehicle heading (or vehicle path) that produces a target trailer position or trailer path. The controller 32 may search iteratively for the target vehicle heading that satisfies the first position solution, the second position solution or both for each evaluation time interval. In turn, the controller 32 may instruct the steering system to steer the vehicle 50 in accordance with the target vehicle heading.

Figure 7:
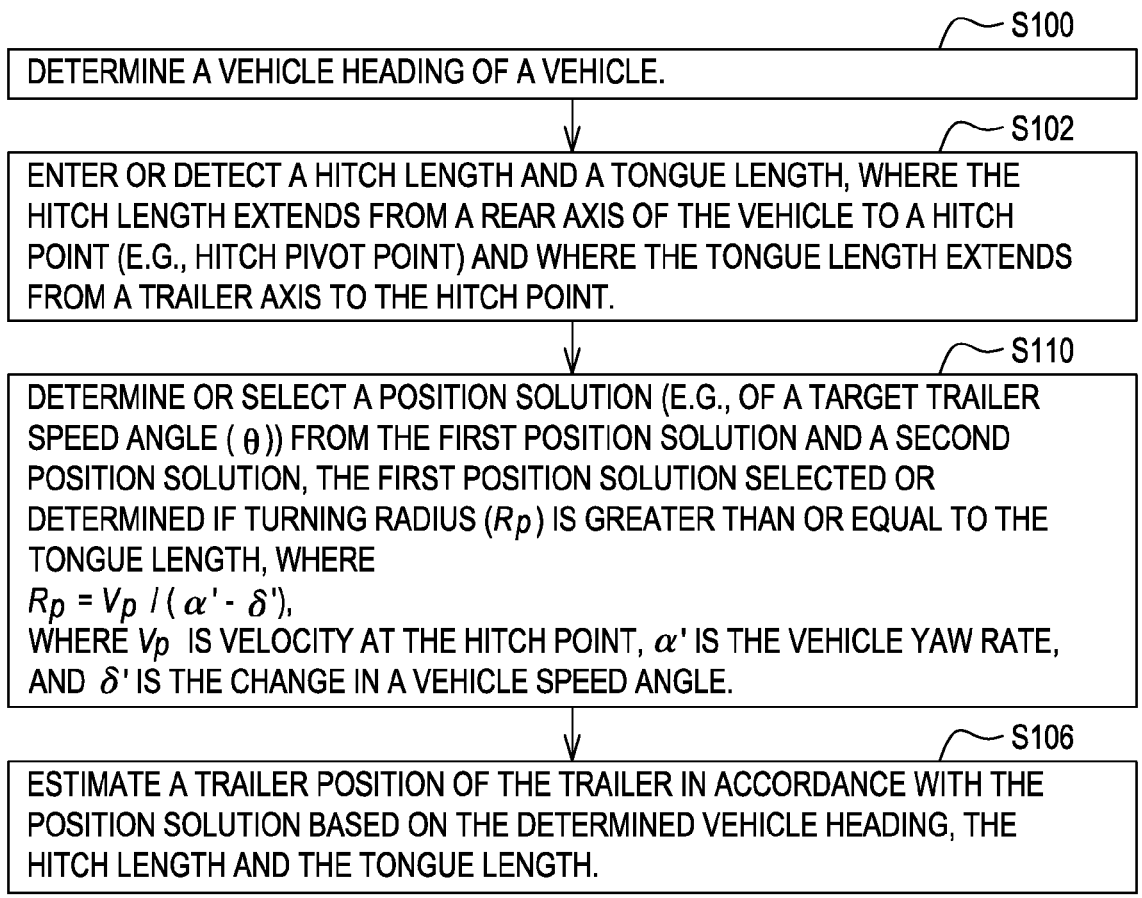
FIG. 7 is a flow chart of yet another embodiment of a method for estimating a trailer position of a trailer associated with a vehicle.

The method of FIG. 7 is similar to the method of FIG. 5, except step S104 is replaced by step S110. Like reference numbers in FIG. 5 and FIG. 7 indicate like steps or procedures. The method of FIG. begins in step S100.

In step S100, a vehicle heading of a vehicle (e.g., 50) is determined. For example, a first location-determining receiver 14 determines a vehicle heading of a vehicle 50 with reference to a reference heading (e.g., magnetic North pole or N).

Step S100 may be executed in accordance with one or more techniques that may be applied alternately or cumulatively. Under a first technique, a first location-determining receiver 14 determines a vehicle heading of a vehicle 50 with reference to a reference heading (e.g., magnetic North pole or N).

Under a second technique, a first location-determining receiver 14 determines a vehicle heading of a vehicle 50 with reference to a reference heading (e.g., magnetic North pole or N) and an optional second location-determining receiver 46 determines (e.g., to the best of its ability) a trailer heading of a trailer with reference a reference heading (e.g., magnetic North pole or N).

Under a third technique, a first location-determining receiver 14 determines a vehicle heading of a vehicle 50 with reference to a reference heading (e.g., magnetic North pole or N) and an optional angle sensor 146 determines (or facilitates derivation of) a trailer heading of a trailer 52 with reference to reference heading (e.g., magnetic North pole or N). In one embodiment, if the optional angle sensor 146 is used, the data processor 22 may derive or calculate the trailer heading from a hitch angle and vehicle heading. For example, the data processor 22 may determine the trailer heading from data input from the optional angle sensor 146 based on the following equation: $\beta=\alpha-\gamma$, where $\beta$ is the trailer heading, $\alpha$ is the vehicle heading, and $\gamma$ is the hitch angle.

In step S102, a user interface 26 supports a user's entry of a hitch length and a tongue length, or a sensor detects a hitch length and a tongue length, where the hitch length extends from a rear axis of the vehicle to a hitch point (e.g., hitch pivot point) and where the tongue length extends from a trailer 52 axis to the hitch point (e.g., hitch pivot point). The hitch length and tongue length may be stored in a data storage device 32 (e.g., non-volatile memory) for later retrieval by a data processor 22, for example.

In step S110, a data processor 22 determines a position solution or selects a position solution (e.g., of a target trailer slip angle $\theta$) from a first position solution and a second position solution. For example, first position solution is selected or determined (by the data processor 22) if the turning radius of the hitch pivot point ($R_p$) is greater than or equal to the tongue length, where $Rp=Vp/(\alpha'-\delta')$, where $V_p$ is the velocity at the hitch point (e.g., hitch pivot point), $\alpha'$ is the vehicle yaw rate, and $\delta'$ is the change in a vehicle slip angle. In one embodiment, the first position solution is associated with steady state movement or a model of steady state movement of the trailer 52 with respect to a target path.

Step S110 may be carried out by various techniques that may be applied separately or cumulatively. Under a first technique, the first position solution for the trailer slip angle $\theta$ is determined by the data processor 22 in accordance with the following equations:

$$\theta = \theta_\infty + 2\tan(y), \text{ where } \theta_\infty = \arcsin\left(\frac{\overline{BC}}{R_p}\right),$$

$$y = \frac{-y_1 \cos\theta_\infty}{1 - y_1 \sin\theta_\infty}, \quad y_1 = \frac{y_0}{y_0 \sin\theta_\infty - \cos\theta_\infty} e^{-(\cos\theta_\infty/\lambda)t},$$

$\theta=\alpha-\beta-\delta$, $\alpha$ is the vehicle heading, $\beta$ is the trailer heading, $\delta$ is the vehicle slip angle, and $\overline{BC}$ is the tongue length, $\lambda=\overline{BC}/V_p$, and t is time.

Under a second technique, the first position solution for the trailer slip angle $\theta$ is determined by the data processor 22 in accordance with the following equations: $\theta=\theta_\infty+2\tan(\gamma)$, where $$\theta_\infty = \arcsin\left(\frac{\overline{BC}}{R_p}\right), \quad y = \frac{-y_1 \cos\theta_\infty}{1 - y_1 \sin\theta_\infty},$$

$$y_1 = \frac{y_0}{y_0 \sin\theta_\infty - \cos\theta_\infty} e^{-(\cos\theta_\infty/\lambda)t},$$

$\theta=\alpha-\beta-\delta$, $\alpha$ is the vehicle heading, $\beta$ is the trailer heading, $\delta$ is the vehicle slip angle, and $\overline{BC}$ is the tongue length, $\lambda = \overline{BC}/V_p$, t is time, and wherein: $V_p$ is the velocity at the hitch point (e.g., hitch pivot point) based on $$V_p = \sqrt{V_t^2 + (\overline{AC} \cdot \alpha')^2},$$

$V_t$ is the vehicle speed at control point, $\alpha'$ is the vehicle yaw rate, $\overline{AC}$ in the hitch length.

In step S106, the data processor 22 estimates a trailer position of the trailer in accordance with the position solution (e.g., the selected position solution) based on the determined vehicle heading, the hitch length and the tongue length. Additional aspects of S106 that were previously described in this document apply with equal force to the method of FIG. 6.

In an alternate embodiment, step S106 may support the determination of a target vehicle heading (or vehicle path) that produces a target trailer position or trailer path. The controller 32 may search iteratively for the target vehicle heading that satisfies the first position solution, the second position solution or both for each evaluation time interval. In turn, the controller 32 may instruct the steering system to steer the vehicle 50 in accordance with the target vehicle heading.

In another alternate embodiment step S106 may further comprise the data processor 22 controlling a path of a vehicle by instructing a steering system 30 to steer the vehicle in accordance with the position solution (e.g., the selected position solution) based on the determined vehicle heading, the hitch length and the tongue length.

Figure 8:
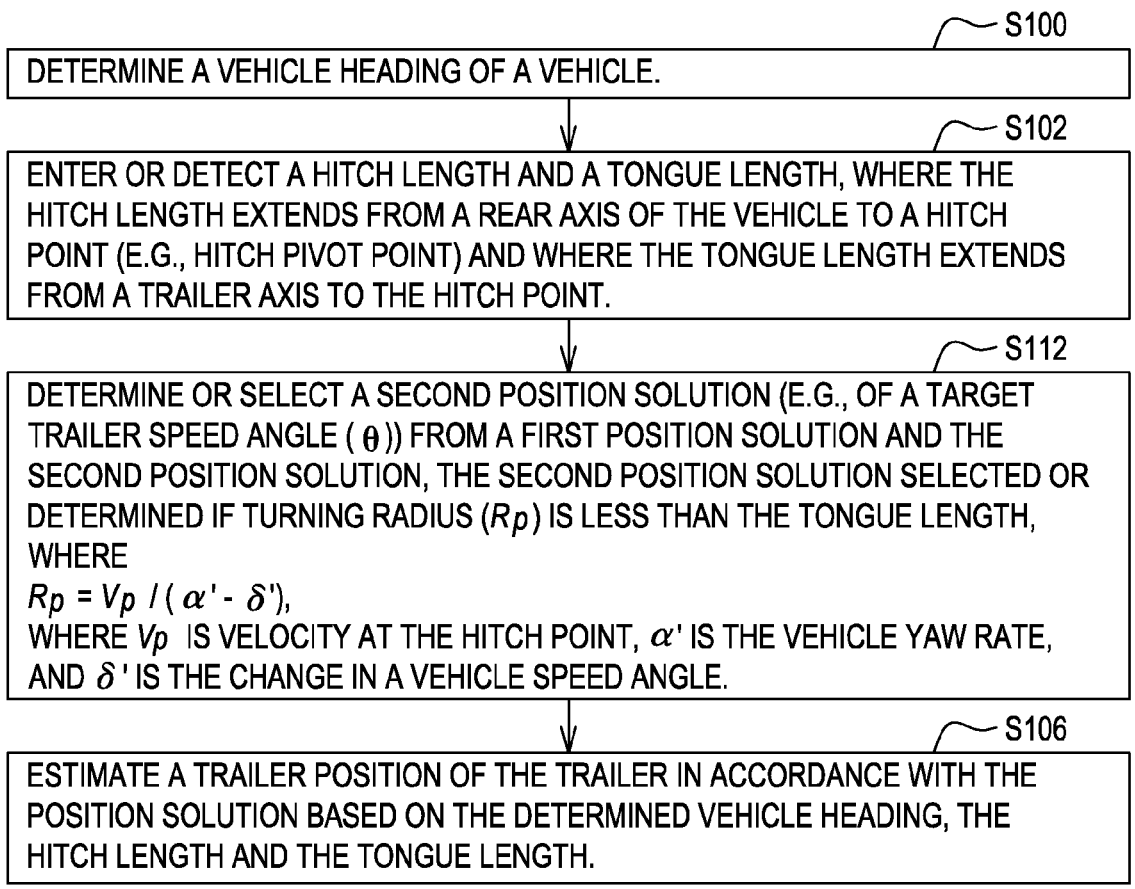
FIG. 8 is a flow chart of still another embodiment of a method for estimating a trailer position of a trailer associated with a vehicle.

The method of FIG. 8 is similar to the method of FIG. 5, except step S104 is replaced by step S112. Like reference numbers in FIG. 5 and FIG. 7 indicate like steps or procedures. The method of FIG. begins in step S100.

Step S100 may be executed in accordance with one or more techniques that may be applied alternately or cumulatively. Under a first technique, a first location-determining receiver 14 determines a vehicle heading of a vehicle 50 with reference to a reference heading (e.g., magnetic North pole or N).

Under a second technique, a first location-determining receiver 14 determines a vehicle heading of a vehicle 50 with reference to a reference heading (e.g., magnetic North pole or N) and an optional second location-determining receiver 46 determines (e.g., to the best of its ability) a trailer heading of a trailer with reference a reference heading (e.g., magnetic North pole or N).

Under a third technique, a first location-determining receiver 14 determines a vehicle heading of a vehicle 50 with reference to a reference heading (e.g., magnetic North pole or N) and an optional angle sensor 146 determines (or facilitates derivation of) a trailer heading of a trailer 52 with reference to reference heading (e.g., magnetic North pole or N). In one embodiment, if the optional angle sensor 146 is used, the data processor 22 may derive or calculate the trailer heading from a hitch angle and vehicle heading. For example, the data processor 22 may determine the trailer heading from data input from the optional angle sensor 146 based on the following equation: $\beta=\alpha-\gamma$, where $\beta$ is the trailer heading, $\alpha$ is the vehicle heading, and $\gamma$ is the hitch angle.

In step S102, a user interface 26 supports a user's entry of a hitch length and a tongue length, or an optical measuring device 28 or another sensor detects a hitch length and a tongue length, where the hitch length extends from a rear axis of the vehicle to a hitch point (e.g., hitch pivot point) and where the tongue length extends from a trailer axis to the hitch point (e.g., hitch pivot point). The hitch length and tongue length may be stored in a data storage device 32 (e.g., non-volatile memory) for later retrieval by a data processor 22, for example.

In step S112, a data processor 22 determines a position solution or selects a position solution (e.g., of a target trailer 52 slip angle $\theta$) from a first position solution and a second position solution. For example, the second position solution is selected or determined (by the data processor 22) if the turning radius of the hitch pivot point ($R_p$) is less than the tongue length, where $Rp=Vp/(\alpha'-\delta')$, where $V_p$ is the velocity at the hitch point (e.g., hitch pivot point), $\alpha'$ is the vehicle yaw rate, and $\delta'$ is the change in a vehicle slip angle. In one embodiment, the second position solution is associated with dynamic movement or a model of dynamic movement of the trailer 52 with respect to a target path.

In step S112 under one technique for determining or selecting the position solution, the second position solution for the trailer 52 slip angle $\theta$ is determined by the data processor 22 in accordance with integration of the following expression:

$$-\frac{2}{\sqrt{(\overline{BC}/R_p)^2-1}} \arctan\left[\frac{1-\tan\left(\frac{\theta}{2}\right)}{\sqrt{(\overline{BC}/R_p)^2-1}}\right]\Bigg|_{\theta_0}^{\theta} = t,$$

where $\overline{BC}$ is the tongue length, $R_p=V_p/(\alpha'-\delta')$, $\alpha'$ is the vehicle yaw rate, $\delta'$ is the change in a vehicle slip angle; $V_p$ is the velocity at the hitch point (e.g., hitch pivot point) based on $$V_p = \sqrt{V_t^2 + (\overline{AC} \cdot \alpha')^2},$$

$V_p$ is the vehicle speed at control point, $\overline{AC}$ is the hitch length, and a $\alpha'$ is the vehicle yaw rate, t is time and $\theta_0$ is the initial trailer 52 slip angle, $\alpha$ is the vehicle heading, $\beta$ is the trailer heading, and $\delta$ is the vehicle slip angle.

In step S106, the data processor 22 estimates a trailer position of the trailer in accordance with the position solution (e.g., the selected position solution) based on the determined vehicle heading, the hitch length and the tongue length. Additional aspects of S106 that were previously described in this document apply with equal force to the method of FIG. 6.

In an alternate embodiment, step S106 may support the determination of a target vehicle heading (or vehicle path) that produces a target trailer position or trailer path. The controller 32 may search iteratively for the target vehicle heading that satisfies the first position solution, the second position solution or both for each evaluation time interval. In turn, the controller 32 may instruct the steering system to steer the vehicle 50 in accordance with the target vehicle heading.

In an alternate embodiment step S106 may further comprise the data processor 22 controlling a path of a vehicle by instructing a steering system 30 to steer the vehicle in accordance with the position solution (e.g., the selected position solution) based on the determined vehicle heading, the hitch length and the tongue length.

In any of the method of FIG. 5 through FIG. 8, the data processor 22 can select the position solution (e.g., first position solution or second position solution) for a time interval and may change, alternate or switch between the first position solution and the second position solution at the expiration of any time interval.

The system and method of the disclosure are well suited for real-time selection of an accurate position solution for the trailer that is based on a first position solution for steady state motion of the trailer with reference to a target path or based on a second position solution for dynamic motion of the trailer with reference to a target path. Further, the system and method of the disclosure are well suited for reaching an accurate position solution for the trailer based on an alternate selection of the first position solution or the second position solution during a series of time intervals as appropriate. The system and method facilitates the production of a more accurate solution than available through a single model of the motion of the trailer that might not otherwise represent its true path, or adequately model the complexities of the trailer motion with respect to a desired target path.

Reliable, accurate and timely estimates of the trailer position or trailer path of the trailer (e.g., an implement) are useful for executing certain agricultural, construction, forestry, mining, or other work tasks. For example, if the trailer comprises an implement that performs an agricultural task, such as distribution of fertilizer, herbicide, insecticide, fungicide, chemicals, seeds, or crop inputs, the accurate path of the trailer may lead to savings in the aggregate amount of chemicals or crop inputs applied to cover a field or a work area of land, by reducing potential overlap in the chemicals or crop inputs applied in adjacent paths, rows or swaths of the vehicle and trailer.

Having described the preferred embodiment, it will become apparent that various modifications can be made without departing from the scope of the invention as defined in the accompanying claims.

The following is claimed:

1. A method for estimating, by a controller, a trailer position of a trailer associated with a vehicle, where the controller comprises a data processor and a data storage device coupled to a data bus, the method comprising:
    determining a vehicle heading of a vehicle with reference to a reference heading;
    entering or detecting a hitch length and a tongue length, where the hitch length extends from a rear axis of the vehicle to a hitch point and where the tongue length extends from a trailer axis to the hitch point;
    selecting a position solution from a first position solution and a second position solution based on a comparison between a turning radius at the hitch point, $R_p$, and the tongue length, where $R_p=V_p/(\alpha'-\delta')$, where $V_p$ is a velocity at the hitch point, $\alpha'$ is the vehicle yaw rate, and $\delta'$ is the change in a vehicle slip angle; and
    estimating a trailer position of the trailer in accordance with the position solution based on the determined vehicle heading, the hitch length and the tongue length.

2. The method according to claim 1 wherein:
$V_p$ is the velocity at the hitch point based on $$V_p = \sqrt{V_t^2 + (\overline{AC}\cdot\alpha')^2},$$

$V_t$ is the vehicle speed at control point, $\overline{AC}$ is the hitch length, and $\alpha'$ is the vehicle yaw rate.

3. The method according to claim 1 wherein the first position solution is selected where $R_p$ is greater than or equal to the tongue length.

4. The method according to claim 1 wherein the second position solution is selected where $R_p$ is less than the tongue length.

5. The method according to claim 1 wherein the first position solution is associated with a steady state movement of the trailer with respect to a target trailer path.

6. The method according to claim 1 wherein the second position solution is associated with dynamic movement of the trailer with respect to a target trailer path.

7. The method according to claim 1 wherein the first position solution for the trailer slip angle $\theta$ is in accordance with the following equations:

$\theta=\theta_\infty+2\tan(y)$, where $$\theta_\infty = \arcsin\left(\frac{\overline{BC}}{R_p}\right), y = \frac{-y_1\cos\theta_\infty}{1-y_1\sin\theta_\infty},$$

$$y_1 = \frac{y_0}{y_0\sin\theta_\infty - \cos\theta_\infty}e^{-(\cos\theta_\infty/\lambda)t},$$

$\theta=\alpha-\beta-\delta$, $\alpha$ is the vehicle heading, $\beta$ is the trailer heading, $\delta$ is the vehicle slip angle, and $\overline{BC}$ is the tongue length, $\lambda=\overline{BC}/V_p$, and t is time.

8. The method according to claim 7 wherein
$V_p$ is a velocity at the hitch point based on $$V_p = \sqrt{V_t^2 + (\overline{AC}\cdot\alpha')^2},$$

$V_t$ is the vehicle speed at control point, $\alpha'$ is the vehicle yaw rate, and $\overline{AC}$ is the hitch length.

9. The method according to claim 1 wherein the second position solution for the trailer slip angle $\theta$ is determined in accordance with integration of the following expression:

$$-\frac{2}{\sqrt{(\overline{BC}/R_p)^2-1}}\arctan\left[\frac{1-\tan\left(\frac{\theta}{2}\right)}{\sqrt{(\overline{BC}/R_p)^2-1}}\right]\Bigg|_{\theta_0}^{\theta} = t,$$

where $\overline{BC}$ is the tongue length, $R_p=V_p/(\alpha'-\delta')$ where $\alpha'$ is the vehicle yaw rate, $\delta'$ is the change in a vehicle slip angle, $V_p$ is a velocity at the hitch point based on $$V_p = \sqrt{V_t^2 + (\overline{AC}\cdot\alpha')^2},$$

$V_t$ is the vehicle speed at control point, $\overline{AC}$ is the hitch length, and $\alpha'$ is the vehicle yaw rate, t is time, and $\theta_0$ is the initial trailer slip angle, and $\theta=\alpha-\beta-\delta$, $\alpha$ is the vehicle heading, $\beta$ is the trailer heading, $\delta$ is the vehicle slip angle.

10. The method according to claim 1 wherein the position solution is selected for a time interval and may be changed between the first position solution and the second position solution at the expiration of any time interval.

11. The method according to claim 1 wherein the vehicle comprises a tractor and the trailer comprises an implement.

12. A system for estimating a trailer position of a trailer associated with a vehicle with a trailer, the system comprising:

a first location determining receiver for determining a vehicle heading of a vehicle with reference to a reference heading;

a user interface for entering or an optical measuring device for detecting a hitch length and a tongue length, where the hitch length extends from a rear axis of the vehicle to a hitch point and where the tongue length extends from a trailer axis to the hitch point;

a data processor for selecting a position solution from a first position solution and a second position solution based on a comparison between a turning radius at hitch pivot point, $R_p$, and the tongue length, where $Rp=Vp/(\alpha'-\delta')$, where $V_p$ is a velocity at the hitch point, $\alpha'$ is the vehicle yaw rate, and $\delta'$ is the change in a vehicle slip angle; and the data processor for estimating a trailer position of the trailer in accordance with the selected position solution based on the determined vehicle heading, the hitch length and the tongue length.

13. The system according to claim 12 wherein $V_p$ is the velocity at the hitch point based on $$V_p = \sqrt{V_t^2 + (\overline{AC} \cdot \alpha')^2},$$

$V_t$ is the vehicle speed at control point, $\overline{AC}$ is the hitch length, and $\alpha'$ is the vehicle yaw rate.

14. The system according to claim 12 wherein the data processor is adapted to select the first position solution if $R_p$ is greater than or equal to the tongue length.

15. The system according to claim 12 wherein the data processor is adapted to select the second position solution is selected if $R_p$ is less than the tongue length.

16. The system according to claim 12 wherein the first position solution is associated with a steady state movement of the trailer with respect to a target trailer path.

17. The system according to claim 12 wherein the second position solution is associated with dynamic movement of the trailer with respect to a target trailer path.

18. The system according to claim 12 wherein the first position solution for the trailer slip angle $\theta$ is determined by the data processor in accordance with the following equations:

$\theta = \theta_\infty + 2 \tan(y)$, where $$\theta_\infty = \arcsin\left(\frac{\overline{BC}}{R_p}\right), y = \frac{-y_1 \cos\theta_\infty}{1 - y_1 \sin\theta_\infty},$$

$$y_1 = \frac{y_0}{y_0 \sin\theta_\infty - \cos\theta_\infty} e^{-(\cos\theta_\infty/\lambda)t},$$

$\theta = \alpha - \beta - \delta$, $\alpha$ is the vehicle heading, $\beta$ is the trailer heading, $\delta$ is the vehicle slip angle, and $\overline{BC}$ is the tongue length, $\lambda = \overline{BC}/V_p$, and t is time.

19. The system according to claim 18 wherein $V_p$ is velocity at the hitch point based on $$V_p = \sqrt{V_t^2 + (\overline{AC} \cdot \alpha')^2},$$

$V_t$ is the vehicle speed at control point, $\alpha'$ is the vehicle yaw rate, $\overline{AC}$ in the hitch length.

20. The system according to claim 12 wherein the second position solution for the trailer slip angle $\theta$ is determined by the data processor in accordance with integration of the following expression:

$$-\frac{2}{\sqrt{(\overline{BC}/R_p)^2 - 1}} \arctan\left[\frac{1 - \tan\left(\frac{\theta}{2}\right)}{\sqrt{(\overline{BC}/R_p)^2 - 1}}\right]\Bigg|_{\theta_0}^{\theta} = t,$$

where $\overline{BC}$ is the tongue length, $R_p = V_p/(\alpha'-\delta')$, $\alpha'$ is the vehicle yaw rate, $\delta'$ is the change in a vehicle slip angle, R is the turning radius at a hitch pivot point; $V_p$ is the velocity at the hitch point based on $$V_p = \sqrt{V_t^2 + (\overline{AC} \cdot \alpha')^2},$$

$V_t$ is the vehicle speed at control point, $\overline{AC}$ is the hitch length, $\alpha'$ is the vehicle yaw rate, t is time, $\theta_0$ is the initial trailer slip angle, $\theta = \alpha - \beta - \delta$, $\alpha$ is the vehicle heading, $\beta$ is the trailer heading, $\delta$ is the vehicle slip angle.

21. The system according to claim 12 wherein the position solution is selected for a time interval and may be changed between the first position solution and the second position solution at the expiration of any time interval.

22. The system according to claim 12 wherein the vehicle comprises a tractor and the trailer comprises an implement.

23. The system according to claim 12 further comprising:
a second location-determining receiver with an antenna on the trailer for determining a trailer heading or trailer position, where the position solution is continuously or repeatedly determined, but only applied when the second location-determining receiver fails to reliably receive a minimum required number of satellite signals or a differential correction signal during a down time period.

24. The system according to claim 12 further comprising:
an angle sensor associated with the trailer for determining a trailer heading or trailer position, where the position solution is continuously determined, but only applied when the angle sensor fails to determine or communicate a hitch angle to the data processor for determination of the trailer heading or the trailer position during a down time period.

* * * * *